United States Patent [19]
Splett et al.

[11] Patent Number: 5,001,712
[45] Date of Patent: Mar. 19, 1991

[54] DIAGNOSTIC ERROR INJECTION FOR A SYNCHRONOUS BUS SYSTEM

[75] Inventors: Katherine A. Splett, Apple Valley; Dexter L. Wesson, Burnsville, both of Minn.

[73] Assignee: Unisys Corporation, Blue Bell, Pa.

[21] Appl. No.: 258,540

[22] Filed: Oct. 17, 1988

[51] Int. Cl.$^5$ ............... G01R 31/28; G06F 11/00
[52] U.S. Cl. ............................ 371/3; 371/29.5
[58] Field of Search ............ 370/13; 371/3, 3.1.5.2, 371/23, 27, 29.5

[56] References Cited

U.S. PATENT DOCUMENTS 4,476,560 10/1984 Miller et al. ............ 371/15
4,759,019 7/1988 Bentley et al. ............ 371/3

OTHER PUBLICATIONS

Slater, M., *Microprocessor-Based Design*, Mayfield Pub. Co., 1987, pp. 107–108.

Primary Examiner—Jerry Smith
Assistant Examiner—Stephen M. Baker
Attorney, Agent, or Firm—Glenn W. Bowen; Mark T. Starr

[57] ABSTRACT

Bus error injection circuit generates bus errors to test proper operation of bus error detection and recovery in a system of modules interconnected by a synchronous digital bus. Application of the circuit is but error detection and recovery tests for a physical realization of the system. The bus error injection circuit can be replicated on a number of modules interconnected by a synchronous bus to provide multiple sources of error injection. One module, or multiple modules, with error injection circuitry is designated as the source(s) to inject a transient bus error. The bus error injection circuitry monitors the bus to determine when the module is a participant in a bus transfer cycle on the bus. An error injection counter decrements for each such cycle. When the counter output value is one, the module derives its error injection pattern onto bus signal lines in place of the signal line values normally generated. When the counter output reaches zero, the count enable is disabled and the signals normally supplied for the next bus cycle are enabled to the bus.

6 Claims, 3 Drawing Sheets

DIAGNOSTIC ERROR INJECTION FOR A SYNCHRONOUS BUS SYSTEM

BACKGROUND OF THE INVENTION (a) Field of the Invention

The field of the invention is built-in diagnostic tools for data processing systems and, more particularly, systems which verify with a high level of confidence the physical realization of the bus error detection and bus error recovery circuitry in a synchronous bus system.

(b) Description of the Background

Many newer data processing system architectures are distributed systems, consisting of a collection of several basic functional units. Each functional unit or module performs particular tasks required by the system. Examples of a functional unit are the circuitry for a general purpose processor, an I/O interface or a signal processor. Modules are interconnected in different ways to satisfy the specific requirements of a particular system application. Many applications interconnect modules, or a subset of the modules, in a system by means of a synchronous digital bus.

Reliable systems require complex, special purpose test circuitry and extensive diagnostic software to verify the operational error detection and error recovery logic circuitry on a module. Moreover, verification of this logic related to communication among modules via buses is critical for proper system operation following a bus failure. For instance, when a bus-related circuitry failure is detected on a module by diagnostic testing in a highly reliable, fault tolerant system, the module can be electrically isolated from the system bus and its task reassigned to another module.

Previous methods for testing transient failures in error detection and recovery logic test for each type of bus failure with logic and software dedicated to testing that specific bus failure. The normal operational circuitry and test software involved with bus error detection and recovery must necessarily be unique for each possible type of bus error, as dictated by a bus specification. However, the extensive, special-purpose test circuitry and diagnostic software to generate bus errors can be greatly reduced and replaced by a new methodology which provides a higher level of confidence testing.

SUMMARY OF THE INVENTION

A diagnostic error injection circuit is utilized for a number of modules in a digital system of modules interconnected by a synchronous digital bus. One module (or more) is selected to inject errors onto the synchronous bus during the transfer of a bus message. A module that receives bus signal lines during the bus cycle in which the bus error(s) is injected detects the bus error(s) and recovers from the error(s), as specified by the particular bus standard that is implemented, thereby verifying proper operation of the bus error detection and error handling logic. The error injection circuit provides two modes of operation. During the normal, operational mode, bus signals are driven by a module in accordance with the protocol defined by a particular bus specification.

In error injection mode, all bus signals normally driven during one particular bus transfer cycle of a bus message are replaced by a predefined set of digital values chosen to test a specific bus error condition. Before the module initiates a bus message transfer in error injection mode, a counter and bus test pattern register on the module are initialized for each error injection instance. The counter specifies during which cycle the corresponding test pattern will be driven onto the bus and is decremented during each transfer cycle of the bus message transfer. Logic on the module selects the bus test pattern register output to drive onto the bus signal lines during the bus cycle selected to inject the bus error(s).

Previous methods for testing bus error detection and recovery logic test each type of bus failure with logic and software dedicated to testing a specific bus failure. This invention applies a new concept for test by providing a means of injecting any bus signal error onto the bus and specifying exactly in which bus cycle(s) the error(s) will be injected. The main advantages are that the invention provides the ability to test thoroughly all bus error detection and recovery logic in a system by injecting any bus signal pattern, and the invention allows the same circuitry and methodology to be used for any type of synchronous bus.

BRIEF DESCRIPTION OF THE DRAWINGS

The invention is described by reference to the Figure in which.

TECHNICAL DESCRIPTION OF THE INVENTION

Figure 1:
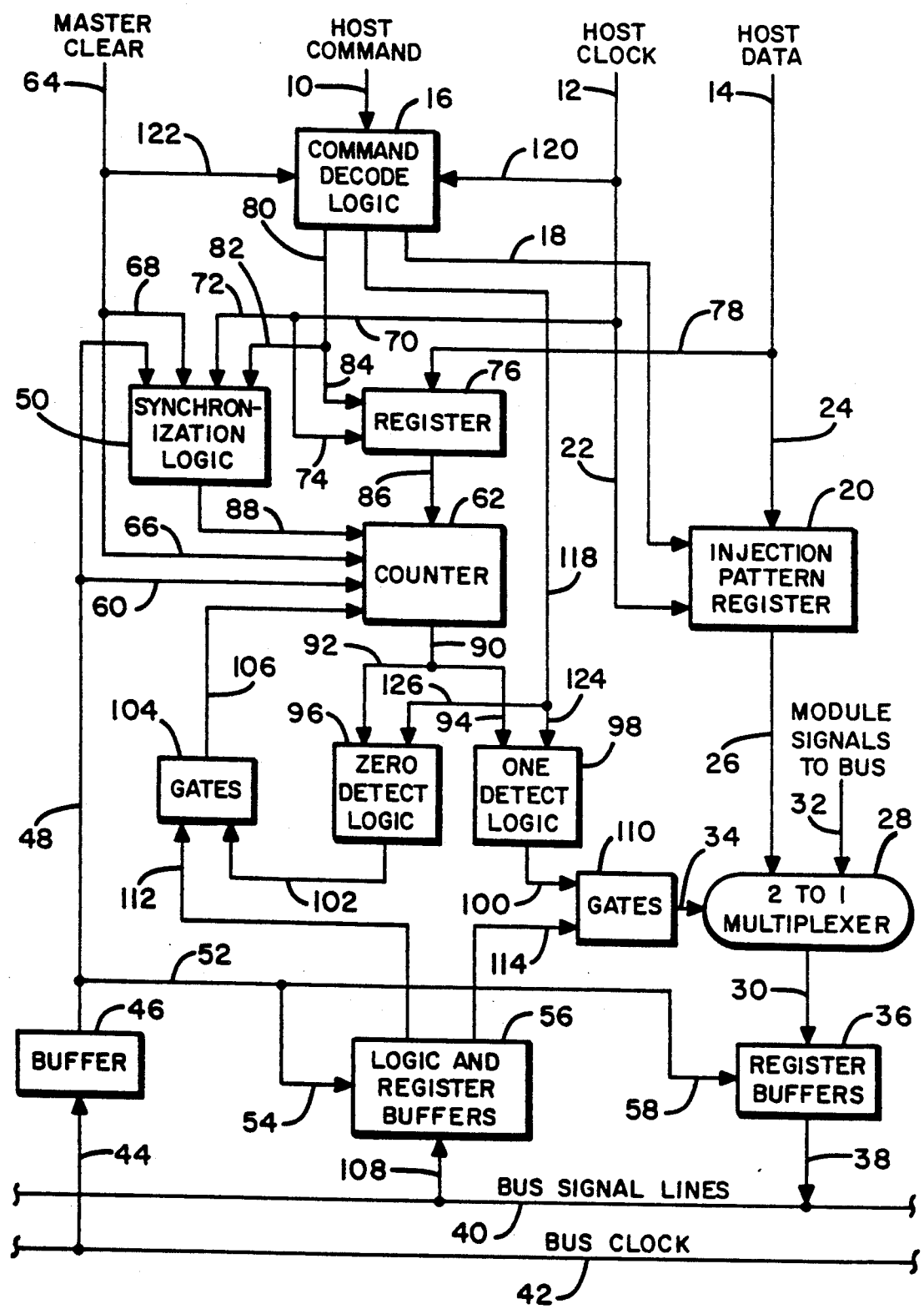
FIG. 1 is a schematic illustration of a system for error injection onto a synchronous digital bus.

The unique test circuitry and software programs required to generate each type of bus error in the previous error detection and recovery systems noted in the Background of the Invention section are replaced by a simple circuit and one generic software routine that is identical for injection of any bus error onto a bus in the present invention. The type of error being injected is determined by data passed to the error injection routine, specifying the cycle or state during which to inject the error and the data to be injected onto the bus during such a cycle. The routine loads the injection bus cycle count into a hardware counter and the bus data into a hardware register, and then either the error injection routine or the calling routine initiates the bus transfer. This approach allows the diagnostic software to specify exactly when the error will occur on the bus and to program any error or combination of errors during a bus cycle without extra test circuitry.

This invention differs from physical hardware test concepts currently used. For example, a reliable system may implement a Hamming code (usually referred to as error detection and correction (EDAC) code) to detect multiple-bit errors and correct single bit data errors. The logic that inputs the data tagged with the EDAC code detects errors and corrects single-bit errors (i.e., recovers from a single-bit error). With the present invention error injection may be used to produce an uncorrectable, an illegal or a correctable EDAC code to drive on the data bus in place of the operational EDAC code to test the EDAC error and recovery logic.

Although current state-of-the-art EDAC logic normally contains a diagnostic EDAC latch to insert a programmable (possibly an uncorrectable, illegal or correctable) EDAC value, this invention differs in the following ways:

Error injection circuitry controls time at which the EDAC error pattern is injected and the length of time the pattern is injected. This more accurately represents the timing of a failure in functional hardware. Existing methods statically drive the EDAC error pattern (as an example) in a diagnostic mode of operation.

In addition to data types of error injection, the invention extends the concept to error injection of control signal values.

All operational hardware responds the same as in its normal functional mode before and after the pattern is injected. No special diagnostic mode or special diagnostic timing cycles are incorporated in place of normal bus hardware timing cycles and, consequently, imposed during the hardware test of a particular error condition.

In the present invention, error injection tests error detection and recovery logic included in functional hardware that uses the erroneous set of signals as inputs. Diagnostic software can be used to initialize the error injection parameters before the hardware test is run and to check hardware conditions set by the normal hardware error detection and recovery logic (for example, faults, interrupts, branch conditions, etc.) after the hardware test is run. However, there is no diagnostic software intervention during the test of a particular error condition. The error injection circuit serves as the mechanism by which the error condition is produced, and is completely separate from the error detection and recovery circuits.

This invention does not include error detection and recovery circuitry. The detection and recovery circuitry is unique for each bus implementation. However, error detection and recovery circuitry must be present in the system hardware to respond to the error being injected. This invention also does not include software. Diagnostic software executed by a computer or processor can be used to control error injection testing, but is not the only possible type of host. Microcode or a more primitive, hardware-driven state machine could control error injection, detection and recovery tests. Such diagnostic software, microcode and hardware-driven machines are known and are implemented by those skilled in the art.

In the operation of this invention, a host such as a computer executing diagnostic software, a microprogrammable controller executing microcode or a hardware-driven state machine initializes error injection parameters by special-purpose diagnostic commands over either the bus under test or a separate bus. It is assumed that the bus under test is operational (i.e., already tested for normal operation). The error injection mode is not set until error injection parameters are initialized. The bus error injection pattern cannot be driven until the error injection mode is set. If error injection parameters are initialized over the bus under test and multiple sources of error injection have been selected, activation of the error injection mode must necessarily be a bus multicast command. A bus transfer is initiated in the same manner as is initiated in a normal, functional mode after the error injection mode is set.

Three host commands must be executed to initialize the bus interface on a module before error injection can occur. A host computer executes host commands to load a register holding the pattern of bus signals to be injected, to load a register holding a count indicating the bus cycle during which to inject the pattern, and to initiate the error injection mode. Host data is output from the host onto the host data bus during load injection count and load pattern register operations to load the respective registers. The load injection count command is captured and synchronized to the bus clock. After synchronization, the data in the injection count register is loaded into a counter synchronized with the bus clock.

In the error injection mode, logic eavesdrops on the bus under test by intercepting bus signal lines valid on an edge of the bus clock. During each cycle in which the logic detects that a module is transferring a bus message and the module is a participant in that bus message, the counter is decremented. (However, a delay during the bus transfer caused by a wait or non-transfer cycle does not decrement the counter.) When the counter output is a value of one, the signals normally driven on the bus during the next cycle are replaced by the output of the bus pattern register. A count of zero disables the count from decrementing further, and the signals to be driven on subsequent cycles are generated again as specified by the particular bus protocol implemented.

After the error is injected, the injection count decrements to zero so that the error is not injected during subsequent bus cycles (the error is injected when the count is one). If the commands to initialize error injection parameters are sent over the same bus being tested, the error injection mode must be disabled before the injection count is reinitialized to test a second error condition. Otherwise, the process to set up and check test results is the same. This ordering of events insures that the error is injected only at the proper time. If any hardware failure occurs in setting up the test or checking the results of the test, (whether it is caused by error injection or not), it is assumed that the system failed the diagnostic test.

A particular embodiment of the invention is disclosed in FIG. 1, which is designed for incorporation into a system having one or more hosts, a multiple number of modules, and a synchronous bus for communication among modules of functional units in the system.

Two clocks are supplied to the embodiment. A host clock on the line 12 is synchronized with the host data on the Bus 14 and the host command on the Bus 10. The Host Clock on the line 12 is supplied to the line 120, which is coupled to the Command Decode Logic 16. The Host Clock on the line 12 is also connected to the line 70, which couples it to the Synchronization Logic 50 via the line 72 and to the clock input of the Register 76 via the line 74. The injection Pattern Register 20 is clocked by the Host Clock on the line 22, which is connected to the line 12.

Since the communication bus which includes the lines 40 is a synchronous bus, it also must have its own clock signal. This bus clock is supplied on the line 42. The Bus Clock on the line 42 is synchronized with the Bus signal lines on the Bus 40 and the module signals to bus on the line 32. The Line 44 couples the bus clock to a Buffer 46, which supplies its output on the line 48 to the Synchronization Logic 50. In addition, the signal on the clock line 48 is connected on the line 60 to the clock input of the counter 62.

The output of the Buffer 46 is also supplied on the line 52 to the line 54 to the Logic and Register Buffers 56 and, in addition, to the line 58 to the Register Buffers 36. The buffered bus clock clocks an internal register in the Register Buffers 36 that holds all signals being driven onto the bus for the entire bus cycle. The bus clock also clocks an internal register in the Logic and Buffer Block 56 which captures all signals at the end of the bus clock cycle that are inputs from the bus.

Each host is capable of supplying host command signals on the Bus 10, a host clock signal on the line 12, and host data on the Bus 14. The host signals initialize the error injection count and the error injection data pattern, and enable the error injection mode for the next message transfer in which the module is an active participant.

The Host Command controls the initialization of the error injection parameters. The Host command signals on the Bus 10 are decoded by the Decode Logic 16. Combinational logic in the Decode Logic 16 decodes the Host Command to load the Error Injection Pattern, and outputs a load injection pattern enable signal on the line 18 to the load enable input of the Injection Pattern Register 20. The Host Data on the Bus 14 are supplied to the data inputs on the Bus 24 and are clocked into the Injection Pattern Register 20 when the load enable input to the register is active. If the number of bits in the Host Data Bus 14 is less than the number of bus signal lines onto which to inject the bus error pattern, then the circuitry for the Injection Pattern Register may be replicated to accommodate multiple Injection Pattern Registers and multiple load injection pattern register enable signals.

The Host Command signals are also decoded combinationally in the Decode Logic Block 16 to enable or disable the error injection mode. The internal enable and disable error injection mode signals are clocked into an internal storage element by the Host Clock input on the line 120, which is connected to the line 12. The internal storage element in the Decode Logic 16 that holds the current state of the error injection mode outputs the error injection mode enable signal on the line 118, which is coupled to the One Detect Logic 98 by the line 124 and is coupled to the Zero Detect Logic 96 by the line 126.

Host data on the line 14, connected to the line 78, is clocked into the Register 76 when the load enable input on the line 84 is active. Combinational logic in the Decode Logic 16 decodes the Host Command to load the Error Injection Counter, and outputs a load injection counter enable signal on the line 80 to the load enable input of the Register 76 on the line 84. The load error injection counter enable signal on the line 80 is also supplied to the line 82 to the Synchronization Logic 50. The Register 76 holds the initial error injection count data until the load error injection counter enable signal is synchronized to the buffered bus clock, which loads the Error Injection Counter 62.

As noted previously, the bus clock on the line 42 is coupled to the Buffer 46 to the Synchronization Logic 50. The Host clock that appears on the line 12 is also coupled to the Synchronization Logic via the lines 70 and 72. The Host Clock and the bus clock inputs to the Synchronization Logic 50 enable the timing of the load error injection count signal on the line 88, which is synchronized with the Host Clock, to be synchronized with the bus clock. The error count information to be loaded into the Counter 62 is stored in the Register 76 and is supplied on the Bus 86 to the Counter 62. The data on the Bus 86 are loaded into the Counter 62 under the control of the timing signal on the timing line 88 from the Synchronization Logic 50, which is the load error injection count command synchronized with the Bus Clock.

Figure 2:
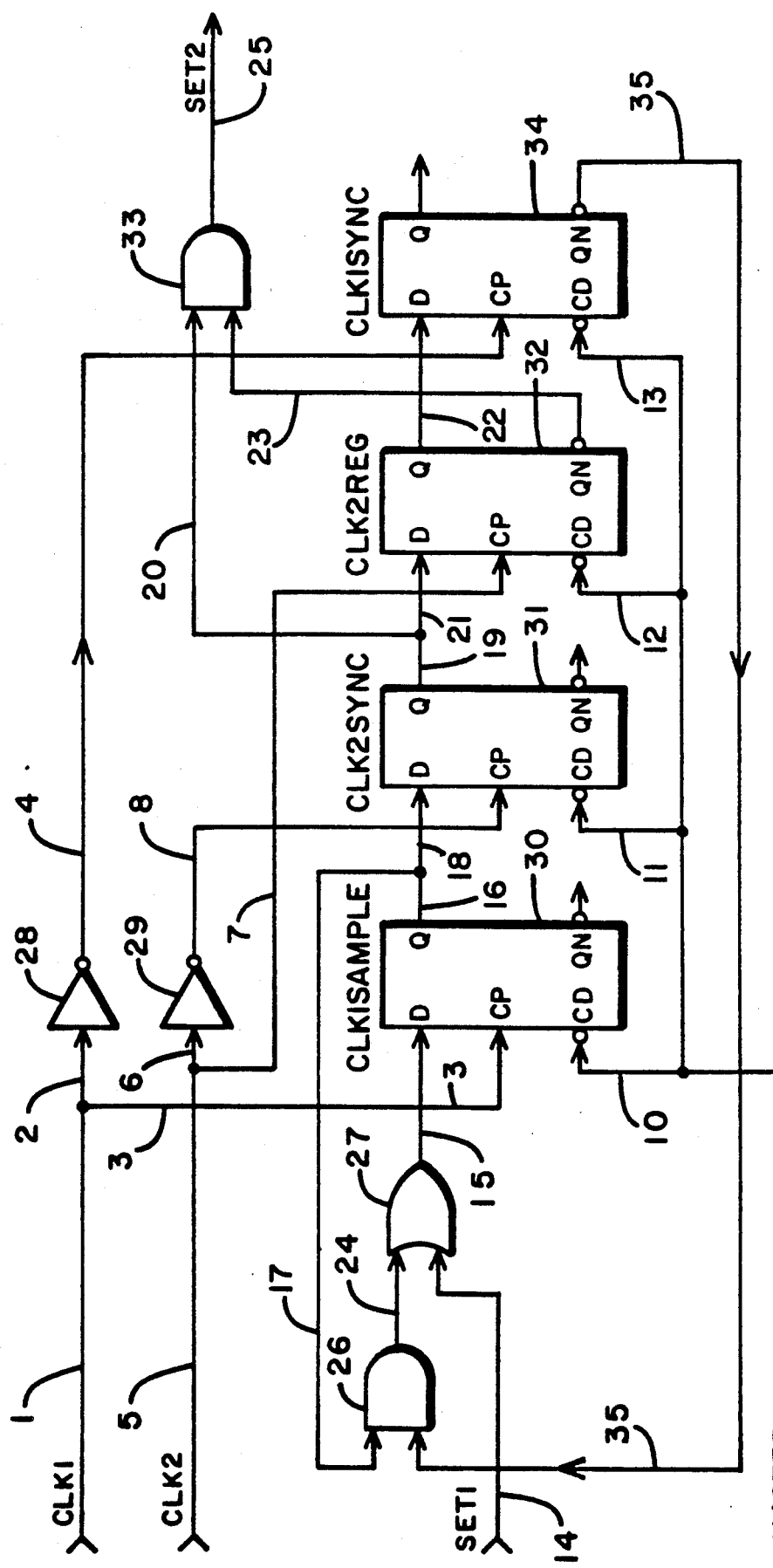
FIG. 2 is a schematic illustration of the synchronization logic for the error injection system of FIG. 1.
Figure 3:
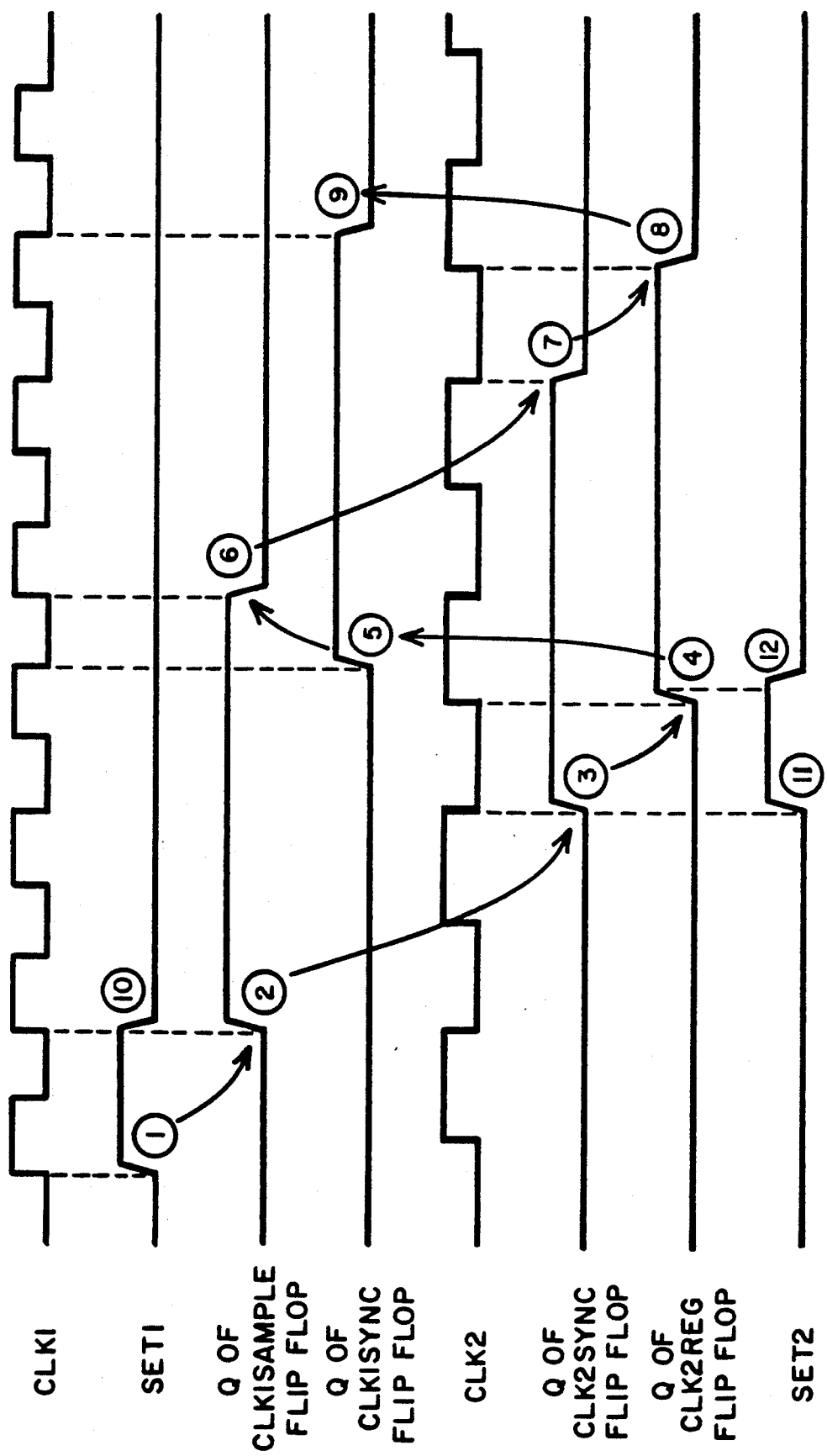
FIG. 3 is a timing chain for the synchronization logic of FIG. 2.

FIG. 2 and FIG. 3 illustrate one circuit that may be used to create a pulse that is synchronized with clock 2 from a signal that is synchronized with clock 1, where clock 1 may be completely asynchronous with respect to clock 2. The circuit design assumes that the minimum time between each clock edge of clock 1 and between each clock edge of clock 2 is longer than the maximum time of the clock to flipflop output delay plus the propagation delay though one AND gate and one OR gate. In particular, the worst case timing for this condition occurs for the case where the level on the flipflop data input does not meet the minimum device-specified set-up and/or hold time requirements, and causes the flipflop data output to go to a metastable state.

The design also assumes that the minimum time between any two adjacent rising edges of the input signal synchronized with clock 1 is longer than the maximum time required for SET1 to propagate through the circuit once to set all flipflops and once to clear all flipflops. Taking into account the asynchrony between the two clocks, the minimum time between two rising edges of the input signal equates to three clock 1 cycles plus three clock 2 cycles.

The input signal SET1 on the line 14 of FIG. 2 is synchronized with clock CLK1 on the line 1 of FIG. 2 and may be active at a high logical level for one clock 1 cycle only (i.e., a pulse). The output signal SET2 on the line 25 of FIG. 2 is coupled to the And Gate 33 and is synchronized with clock CLK2 on the line 5 of FIG. 2. SET2 will be set active at a high logical level on the falling edge of CLK2 and will be set inactive at a low logical level on the next rising edge of CLK2 in response to an active level on SET1 that has been sampled on the rising edge of CLK1 by the CLK1SAMPLE Flipflop 30 and then sampled on the falling edge of CLK2 by the CLK2SYNC Flipflop 31.

The clocks supplied to the Synchronization Logic Block in FIG. 2 are CLK1 and CLK2. The CLK1 input on the line 1 is connected to the line 3 which is coupled to the clock input of Flipflop 30. The line 1 is also coupled to the Inverter 28 via line 2 which, in turn, is coupled to the Flipflop 34 via the line 4. The CLK2 input on the line 5 is supplied to the line 7 which is coupled to the clock input of the CLK2REG Flipflop 32. The line 5 is also connected to the line 6 coupled to the Inverter 29. The output of Inverter 29 connects to the line 8 which couples it to the clock input of the CLK2SYNC Flipflop 31.

The input signal SET1 on the line 14 of FIG. 2 is set during a CLK1 clock cycle (edge 1 in timing diagram) and remains active until the next CLK1 cycle (edge 10 in timing diagram). The CLK1SAMPLE Flipflop 30 initially captures on the rising edge of CLK1 an active level on the signal SET1 input that is to be synchronized to CLK2 (edge 2 in timing diagram). This data input to the CLK1SAMPLE Flipflop 30 on the line 15 is coupled to the Or Gate 27, which is connected to the line 14. The output of the CLK1SAMPLE Flipflop 30 on the line 16 is connected to the line 17. The line 17 is coupled back to the data input of the said flipflop on the line 15 through the And Gate 26 and the Or Gate 27 via the line 24. The line 35 supplied by the inverted data output on the CLK1SYNC Flipflop 34 is also coupled with the And Gate 26. The output of the And Gate 26 on the line 24 remains at a logic one level until the SET1 has propagated through the flipflops synchronized with CLK2 and then is synchronized again with CLK1 by the CLK1SYNC Flipflop 34. The CLK1SAMPLE Flipflop output is cleared on the next rising edge of the CLK1 clock (edge 6 of timing diagram). This path ensures that the input condition has been held until the pulse synchronized with CLK2 has been created.

The output of the CLK1SAMPLE Flipflop 30 on the line 16 also connects to the line 18 which is coupled to the data input of the CLK2SYNC Flipflop 31. The CLK2SYNC Flipflop 31 samples the CLK1SAMPLE Flipflop 30 output on the falling edge of CLK2 (edge 3 in timing diagram) to create a signal that is synchronized with CLK2. The output of the CLK2SYNC Flipflop 31 on the line 19 is supplied to the line 21 and the line 20. The line 21 couples it to the data input of the CLK2REG Flipflop 32. The line 20 couples it to an input of the And Gate 33, which is used to supply the SET2 output on the line 25.

The CLK2REG Flipflop 32 clocks the output of the CLK2SYNC Flipflop 31 one half CLK2 clock cycle later on the rising edge of CLK2. The noninverted data output of the CLK2REG Flipflop 32 is coupled to the data input of the CLK1SYNC Flipflop 34 on the line 22. The inverted data output of the CLK2REG Flipflop 32 is connected to an input of the And Gate 33 on the line 23. The SET2 output synchronized with CLK2 is created during the time CLK2SYNC Flipflop 31 output has been set active (edge 11 of timing diagram) until the time the CLK2REG Flipflop 32 has been set (edge 12 in timing diagram). The negated data output of the CLK2REG Flipflop 32 is used to guarantee the SET2 signal will remain active for one CLK2 cycle only, by inhibiting the CLK2SYNC Flipflop 31 data output through the And Gate 33 to the SET2 output after the CLK2REG Flipflop 32 has been set (edge 4 in timing diagram).

Once the CLK2REG Flipflop 32 has been clocked and the SET2 output has been created, the CLK2REG Flipflop 32 data output is synchronized back to CLK1 by the CLK1SYNC Flipflop 34 which clocks on the falling edge of CLK1 (edge 5 in the timing diagram). The negated output of the CLK1SYNC Flipflop 34 inhibits the feedback path from the output of the CLK1SAMPLE Flipflop 30 to the input of the CLK1SAMPLE Flipflop 30. On the rising edge of CLK1, the output of the CLK1SAMPLE Flipflop 30 returns to inactive state (edge 6 of timing diagram).

The inactive output of the CLK1SAMPLE Flipflop 30 is clocked on the falling edge of CLK2 into the CLK2SYNC Flipflop 31 (edge 7 in the timing diagram). On the next rising edge of CLK2, the inactive output of the CLK2SYNC Flipflop 31 is clocked into the CLK2REG Flipflop 32 (edge 8 in timing diagram). Finally, the inactive output of the CLK2REG Flipflop 32 is clocked into the CLK1SYNC Flipflop 34 on the falling edge of CLK1 (edge 9 in timing diagram). At this point in time, the circuit is able to accept another SET1 pulse.

Initialization of the CLK1SAMPLE Flipflop 30, the CLK2SYNC Flipflop 31, the CLK2REG Flipflop 32 and the CLK1SYNC Flipflop 34 is controlled by the Master Clear line which is supplied to the line 9, which in turn is connected to the line 10 that is coupled with the clear input of the CLK1SAMPLE Flipflop 30. The Master Clear line is also supplied to the line 11 which couples it with the clear input of CLK2SYNC Flipflop 31, to the line 12 that couples it with the clear input of CLK2REG Flipflop 32, and to the line 13 that couples it with the clear input of CLK1SYNC Flipflop 34. The Master Clear input to FIG. 2 is connected to the Master Clear line of the invention.

Referring to FIG. 2 of Synchronization Logic described above, the bus clock signal on the line 48 of the invention is connected to the CLK2 input of FIG. 2. The Host Clock input on the line 12 of the invention is coupled with the CLK1 input of FIG. 2. SET1 of FIG. 2 is supplied by the line 82 of the invention. An logical one SET1 signal indicates that a load error injection count command has been received from the host.

SET2 of FIG. 2 supplies the load enable signal synchronized with the bus clock on the line 88 of the invention to enable the data on the Bus 86 to be loaded into the error injection counter. Synchronization of the load enable signal and capture of the host data in the register 76 during a load initial error injection count command from the host must be done because the host load data and the host load command may no longer be valid on the edge of the bus clock that clocks the error injection counter 62.

Once the Error Injection circuitry has been initialized in the manner described above, the bus transfer in which the error is to be injected may be initiated. When the error injection mode is enabled, the Counter 62 controls an error injection count which is used to determine the precise bus cycle at which the bus error pattern is injected onto the bus signal lines 40. The bus error pattern to be injected is stored in the Register 20.

During the bus cycle in which the bus error injection pattern is input to the Register Buffers 36, the input select supplied on the line 34 to the Multiplexer 28 selects the output of the Injection Pattern Register on the Bus 26 to the Multiplexer ,28 output on the Bus 30, which is coupled to the register Buffers 36. This same multiplexer is used to couple the module bus signals on the Bus 32 to the output bus 30 when the error is not to be driven on the bus during the next bus transfer cycle; that is, during normal bus operation of the module. The logical level of the signal on the line 34 selects whether the Multiplexer 28 input on the Bus 26 or the Multiplexer 28 input on the Bus 32 is driven onto the data output of the Multiplexer 28 on the Bus 30. The Gates 110 couple the control output signal on the line 34 to the Multiplexer 28.

The output of the multiplexer on the Bus 30 is supplied through Buffers 36 to the bus signal lines 40 via the output Bus 38. As stated previously, Buffers 36 include an internal register that clocks data on the data inputs on Bus 30 each bus clock cycle. Communication of the error which has been injected onto the bus signal lines on the Bus 40 is thus accomplished through these lines to other sections of the processing system.

The value in the Counter 62 controls the precise time at which the error information that is coupled on the Injection Pattern Register output on the Bus 26 is to be transmitted through the Multiplexer 28 on the Bus 30 and the Buffer 36 to the bus signal lines 40 during one bus transfer cycle of a continuous chain of normal operational bus transfer cycles. If the host wishes to supply erroneous data to the bus signal lines M cycles from the time a bus message appears on the bus or from the time a bus message is initiated to the bus, then it will supply the value M on the Bus 14 to the Bus 78 and into Register 76 during the load error injection count host command prior to the bus message transfer.

The Counter 62, which is supplied its error count on the Bus 78 and the control signal on the line 84 during the load count host command prior to the bus message transfer counts down from the count under the control of the timing signal 106 from the Gates 104. While in the preferred embodiment, the count is from a predetermined count-down to a count of zero, the counter may also count upwardly to a predetermined value, if desired. In addition, the described embodiment of a multiplexer is activated for one bus transfer cycle only. The logic circuitry could, within the scope of the present invention, be activated for a number of consecutive cycles and supply a number of corresponding injection patterns to the bus. Error information could also be interspersed at predetermined cycles among normal operational bus operational bus message transfer cycles by modifying the logic in a manner known to those skilled in the art.

In the described embodiment, the counter output is provided on the lines 90 to the lines 92 and 94, which are supplied to a One Detect Circuit 98 and a Zero Detect Circuit 96. The error injection mode signal on the line 118 is also connected to the line 124, coupled to the One Detect Circuit 98, and to the line 126, coupled to the Zero Detect Circuit 96. The One Detect Circuit 98 provides a gating signal output on the line 100 when the count of Counter 62 reaches a count of one and the error injection mode is enabled. The signal on the line 100 to the Gates 110 causes the multiplexer to select its input from the bus 26 instead of the Bus 32 during a bus message transfer cycle. Instead of the operational module signals being supplied to the bus signal lines in this case, a set of error signals is supplied through the Multiplexer 28 through the Buffers 36 to the bus lines 40.

In the described embodiment, the multiplexer selects the set of error signals for one bus transfer cycle so that when the count reaches a count of zero, the One Detect Circuit 98 no longer supplies the gating signal on the line 100 to the Gates 110. Instead, the Zero Detect Circuit 96 supplies a gating signal that disables the count enable input to the counter on the line 106 to the Counter 62. The count enable input is also disabled by the Zero Detect Circuit 96 when the error injection mode on the line 126 is disabled.

If the decrement function of the Counter 62 is not disabled by the line 102 supplied from the Zero Detect Circuit 96, the counter will decrement if the line 112 is active when the counter is clocked by the buffered bus clock on the line 60. The line 112 indicates whether a bus message transfer cycle was on the bus during the last bus clock cycle and whether the module is an active participant in the bus message transfer currently taking place on the bus signal lines 40. The bus signal lines 40 are supplied to the lines 108 which are coupled to the Logic and Register Buffers 56.

The data inputs to Buffers 56 are the bus signals that are input from the bus in the normal operational mode. The output of the logic in Buffers 56 is supplied on the line 112 and is coupled to the Gates 104, which in turn supplies the line 106. The line 112 is synchronous with the bus clock coupled through the Buffer 46 to the line 54. This enables the counter to utilize the signal on the line 106 as a countdown signal. The output of the logic in Buffers 56 is also supplied on the line 114 to the Gates 110, and is also synchronous with the buffered bus clock. The line 114 is active when the module is an active participant in the bus message transfer currently taking place on the bus signal lines 40. The error injection pattern is selected by Multiplexer 28 when both the line 114 and the line 100 are active.

The Gates 110 and 104 are thus synchronized with the operation of a bus transfer cycle so that multiplexer control on the detection of a count of one by the One Detect Circuit 98 is provided in synchronization with the Bus Clock, and so that the end of count signal on the line 106 from the Zero Detect Circuit 96 is also synchronized with the operation of the bus transfer cycle.

The Master Clear line that is supplied to the line 64 controls the initialization and clearing of all the storage elements in the Error Injection circuitry. The Master Clear on the line 64 is connected to the line 122, which is coupled to the Command Decode Logic 16. The Master Clear initializes the error injection mode to a disabled state in the Command Decode Logic Block 16. The Master Clear on the line 64 is also supplied on the line 68 to the Synchronization Logic 50 and on the line 66 to the Counter 62. All storage elements in the Synchronization Logic 50 and the Counter 62 are cleared by an active level on the Master Clear line. The Master Clear signal originates in the host or other control section of the processing system.

We claim:

1. In a data processing system which includes a synchronous bus system that comprises a synchronous bus with bus clock and bus signal lines, wherein a plurality of host processors are coupled to said bus system, and further wherein the synchronous bus receives host data, host command and host clock signals from the host processors such that during normal operation module signals are coupled to said bus signal lines during bus transfer cycles under the control of a bus clock signal that is applied to said bus clock lines, the improvement comprising:

error injection means which receives said host data, host command and host clock signals from the host processors wherein said host data signals signify initial error counts and error injection patterns and said host command signals control the enabling and disabling of said error injection means comprising:

monitoring means coupled to said bus clock lines for monitoring when bus transfer cycles occur on said bus which is constructed to produce bus transfer count signals representative of said bus transfer cycles, count means coupled to said monitoring means to receive said bus transfer count signals and to receive said host command signals and said host clock signals for storing binary bit representations of an initial error count when said error injection means is enabled by said host command signal and for counting the number of count signals received from said monitoring means at times that are controlled by said host clock signal, error injection storage means coupled to receive said host data signals and said host clock signals for storing binary bits representative of an error injection pattern, command decode means coupled to receive said host command signals and coupled to said count means and said error injection storage means for supplying control signals that control the entering of said initial error count binary bits into said count means and said error injection pattern binary bits into said error injection means, multiplexing means having a control terminal, input terminals which receive said module signals or said error injection pattern signals as input signals for supplying either said module signals or said error injection pattern signals as output signals to said bus signal lines under the control of a gate signal that is applied to said control terminal, said multiplexing means being further coupled to receive said bus clock signal for supplying said output signals to said bus signal lines at times controlled by said bus clock signal, and gate means coupled to said count means to supply said gate signal to said control terminal of said multiplexing means which is constructed to supply a gate signal that allows said module signals to be supplied through said multiplexing means to said bus signal lines until a first predetermined count is reached, which then allows said error injection pattern be coupled through said multiplexing means to said bus signal lines until a second predetermined count is reached, and which then allows for the resumption of transmission of said module signals through said multiplexing means to said bus signal lines.

2. In a data processing system as claimed in claim 1 the further improvement wherein said error injection means comprises clock synchronization means which receives said host clock signal and said bus clock signals and which supplies a load signal to said count means that controls the loading of said error count into said count means at a time that is synchronized with said bus clock signals.

3. In a data processing system as claimed in claim 1 the further improvement wherein said injection means comprises bus active sensing means coupled to said bus signal lines and to said count means which allows said count means to count said bus transfer cycles only if said bus signal lines are carrying bus signals.

4. In a data processing system as claimed in claim 3 the further improvement wherein said error injection means comprises clock synchronization means which receives said host clock signals and said bus clock signals and which supplies a load signal to said count means that controls the loading of said error count into said count means at a time that is synchronized with said bus clock signals.

5. In a data processing system as claimed in claim 3 the further improvement wherein said bus active sensing means are coupled to said gate means for activating said gate means only when said bus signal lines are active.

6. In a data processing system as claimed in claim 5 the further improvement wherein said error injection means comprises clock synchronization means which receives said host clock signals and said bus clock signals and which supplies a load signal to said count means that controls the loading of said error count into said count means at a time that is synchronized with said bus clock signals.

* * * * *